(12) United States Patent
Hayashi et al.

(10) Patent No.: US 9,689,716 B2
(45) Date of Patent: Jun. 27, 2017

(54) LINEAR ENCODER

(71) Applicant: OKUMA Corporation, Niwa-gun, Aichi (JP)

(72) Inventors: Yasukazu Hayashi, Aichi (JP); Noriyuki Fukui, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 111 days.

(21) Appl. No.: 14/795,943

(22) Filed: Jul. 10, 2015

(65) Prior Publication Data

US 2016/0011017 A1    Jan. 14, 2016

(30) Foreign Application Priority Data

Jul. 10, 2014   (JP) .................................. 2014-142006

(51) Int. Cl.
   *G01D 5/347*   (2006.01)
(52) U.S. Cl.
   CPC ................................ *G01D 5/34753* (2013.01)
(58) Field of Classification Search
   CPC ........... G01D 5/34753; G01D 5/34746; G01D 5/34776; G01D 5/34784; G01D 5/34792
   USPC ......................................... 33/707, 706, 708
   See application file for complete search history.

(56) References Cited

U.S. PATENT DOCUMENTS

| | | | | | |
|---|---|---|---|---|---|
| 3,815,125 | A | * | 6/1974 | May ................... | G01D 5/34753 250/237 G |
| 3,816,003 | A | * | 6/1974 | Litke .................. | G01D 5/34753 33/707 |
| 3,867,037 | A | * | 2/1975 | Litke ...................... | G01B 11/00 33/707 |
| 4,982,508 | A | * | 1/1991 | Nelle ................. | G01D 5/34761 33/702 |
| 5,258,931 | A | * | 11/1993 | Hassler, Jr. ............ | G01D 5/366 250/252.1 |
| 5,383,284 | A | * | 1/1995 | Rieder ................... | G01B 21/02 250/237 G |
| 5,995,229 | A | * | 11/1999 | Omi .................... | G01D 5/34715 33/707 |
| 6,769,195 | B2 | * | 8/2004 | Huber ..................... | F16C 29/00 33/706 |
| 8,234,792 | B2 | * | 8/2012 | Schenk .............. | G01D 5/34769 33/706 |
| 8,448,347 | B2 | * | 5/2013 | Affa ................... | G01D 5/34715 33/702 |
| 9,395,215 | B2 | * | 7/2016 | Motoyuki .......... | G01D 5/34746 |

* cited by examiner

*Primary Examiner* — Christopher Fulton
(74) *Attorney, Agent, or Firm* — Cantor Colburn LLP

(57) ABSTRACT

To provide a linear encoder including a scale unit and a slider that slides along the scale unit, wherein the slider includes a slider enclosure including a slider holding unit, a detection head holding unit mounted inside a scale enclosure of the scale unit, and a pillar extending between the outside and inside of the scale enclosure to connect these two holding units, and a part of the pillar closer to the detection head holding unit and a part of the detection head holding unit closer to the pillar are bored by a thickness larger than a thickness of the pillar.

6 Claims, 2 Drawing Sheets

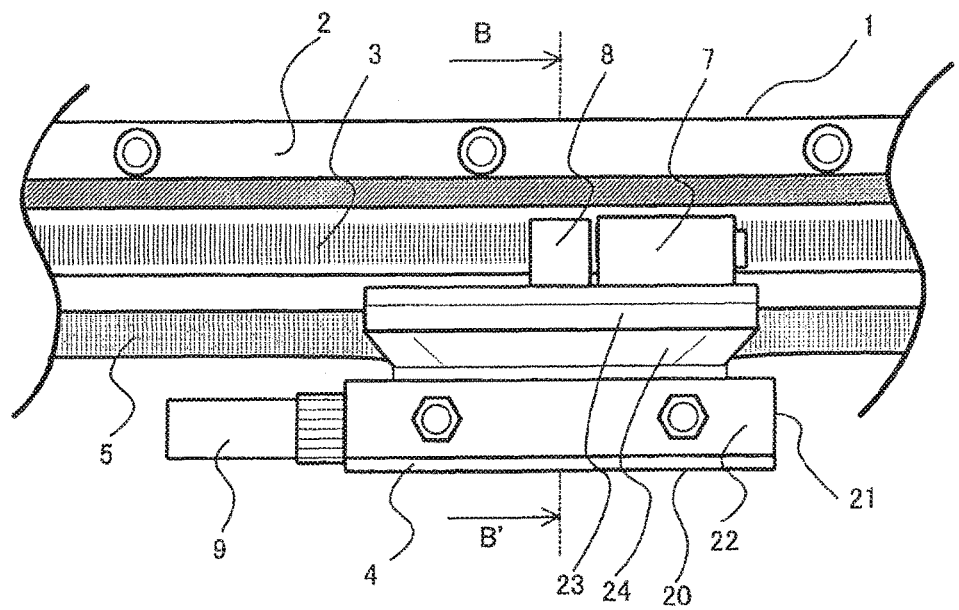
PRIOR ART FIG. 3
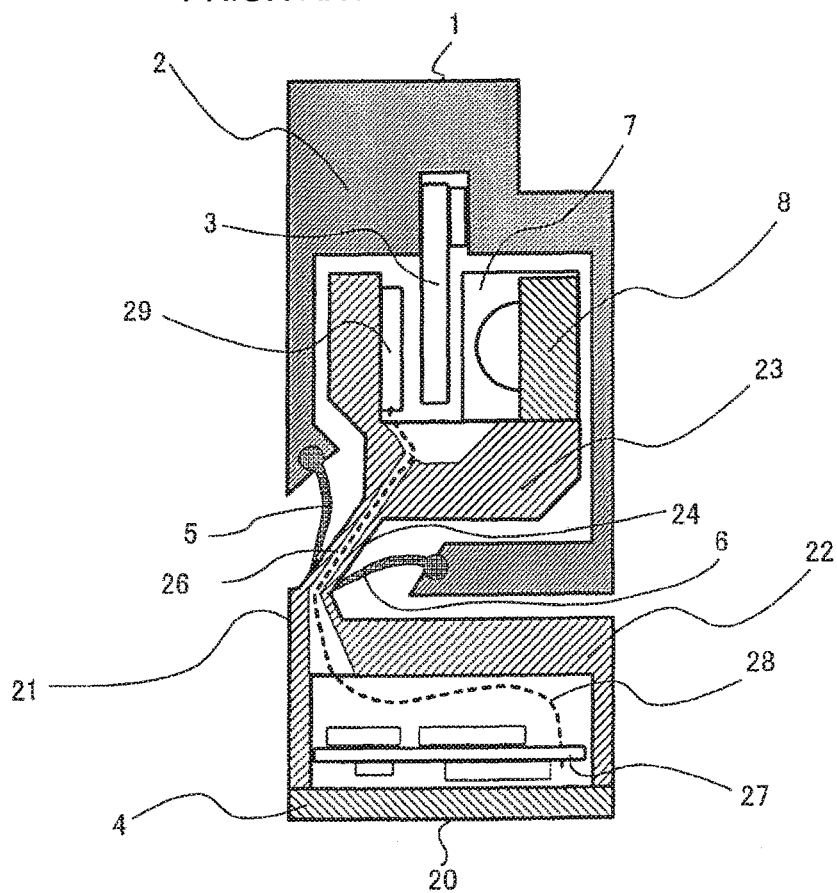
FIG. 4
PRIOR ART

LINEAR ENCODER

PRIORITY INFORMATION

The present invention claims priority under 35 U.S.C. §119 to Japanese Application No. 2014-142006 filed on Jul. 10, 2014, the entire content of which is incorporated herein by reference.

TECHNICAL FIELD

The present invention relates to a linear encoder to be assembled into a machining tool, a semiconductor manufacturing device, or the like, for determining a position of a movable shaft.

BACKGROUND ART

FIG. 3 shows a specific structure of a conventional linear encoder. FIG. 4 is a cross sectional view along line B-B' in FIG. 3. As shown in the cross section in FIG. 4, a scale unit 1 of the conventional linear encoder shown in FIG. 3 includes a scale enclosure 2 that is open at and around a corner defined by the bottom surface thereof and the rear surface thereof, and has a main scale 3 secured inside the scale enclosure 2. The main scale 3 is made of glass, and has a scale made of metallic thin film and carved in matrix on the surface thereof at a constant pitch in the longitudinal direction. A slider unit 20 of the linear encoder includes a slider enclosure 21 roughly including a slider holding unit 22, a detection head holding unit 23, and a pillar 24 that connects the two. The detection head holding unit 23 has a detection head secured thereon including a light-emitting unit 7, a mirror 8, and a light-receiving unit 29. In the detection head, the light emitted from the light-emitting unit 7 is reflected on the mirror 8 at the right angle to be irradiated into the matrix portion of the main scale 3, and the transmitted light is converted into an electric signal by the light-receiving unit 29. The slider holding unit 22 is secured on a moving unit or the like of a machine, using a bolt. The slider holding unit 22 has a built-in circuit board 27 for converting the electric signal from the light-receiving unit 29 into a position data signal. A through hole 26 is formed in the pillar 24 and the detection head holding unit 23 so that an electric wire 28 passes through the through hole 26 from the detection head to the circuit board 27. The position data signal outputted by the circuit board 27 is outputted to the outside via a waterproof connecter 9 mounted on the slider holding unit 22. A cover 4 is securely attached to the slider holding unit 22 to protect the circuit board 27 from water, oil, or the like.

The scale unit 1 and the slider unit 20 are assembled to each other, as shown in FIG. 3, and the detection head, the detection head holding unit 23, and a part of the pillar 24 are accommodated in the scale enclosure 2. Seals 5, 6 are fixedly attached near the opening of the scale enclosure 2. The tip ends of the seals 5, 6 are in contact with each other to thereby close the opening of the scale enclosure 2 to prevent intrusion of dust, water, oil, or the like from the outside. The pillar 24 is long in the longitudinal direction of the scale unit 1, and thin in the width direction, and has a cross section having a ship-like shape. With this shape, the pillar 24 moves while breasting the two seals 5, 6 in the advancing direction as the slider unit 20 moves. Further, with this shape, the tip ends of the seals 5, 6 breasted are brought into contact with each other again on the opposite side of the advancing direction of the pillar 24.

The slider enclosure 21 including the slider holding unit 22, the detection head holding unit 23, and the pillar 24 is integrally molded using metal, such as aluminum or the like, generally by means of lost wax casting, die casting, or the like. However, it is not possible to form the through hole 26 of the detection head holding unit 23 and the pillar 24 by means of integral molding, as the diameter of the hole is very small while the length thereof is as long as five times the hole diameter. Further, in the case where the through hole is formed in post processing, there are available only drill machining and discharge machining with high machining cost, and it is necessary to form a plurality of holes when there are many wires. Still further, as the pillar is very thin, machining defect may likely be caused at the time of drill machining by a drill by breaking through the surface of the pillar. Yet further, while a task of passing a plurality of electric wires through the through hole of the pillar, a task of soldering for connecting the electric wire passing through the through hole to the electric circuit, and a task of pressing the connecter terminal for attachment are necessary, the number of steps required for wiring also presents a problem. Note that as a method for improving a wiring task, there is available a method that uses an FCC (a flexible flat cable) instead of an electric wire. However, in order to pass an FCC through the through hole, it is necessary to form a long hole in the pillar, and formation of such a hole in post processing requires repetitive execution of discharge machining and drill machining. Further, there is available a method, as a method for forming a long hole in a pillar, that forms a part of the pillar of the slider enclosure, using two molded components having a shape divided by a long hole. This method, however, has a problem of reduced strength of the pillar that supports the detection head holding unit.

The present invention has been conceived in view of the above, and an object of the present invention is to implement a slider structure of a linear encoder in which a through hole of a detection head holding unit and a pillar of a slider enclosure is formed by means of integral molding or milling machining, to provide a linear encoder with a lower cost.

SUMMARY OF THE INVENTION

A linear encoder according to the present invention is a linear encoder having a scale unit and a slider that slides along the scale unit, wherein the slider has a slider enclosure including a slider holding unit, a detection head holding unit mounted inside a scale enclosure of the scale unit, and a pillar extending between outside and inside of the scale enclosure to connect these two holding units, and a part of the pillar closer to the detection head holding unit and a part of the detection head holding unit closer to the pillar are bored by a thickness larger than a thickness of the pillar.

In this case, boring of the pillar may be applied to a part closer to the detection head holding unit than a position where a seal secured on the scale enclosure contacts the pillar when the pillar is assembled to the scale unit.

The slider enclosure may be formed so as to include a through hole integrally molded between the part bored of the pillar and the slider holding unit.

The slider enclosure may be given post processing for forming a through hole between the part bored of the pillar and the slider holding unit by means of milling machining.

According to the present invention, a part of the pillar closer to the detection head holding unit and a part of the detection head holding unit closer to the pillar are bored by a thickness larger than the thickness of the pillar. With the above, it is possible to reduce the length of the through hole.

Thus, it is possible to integrally mold the slider enclosure including the through hole by means of lost wax casting, die casting, or the like. Further, even when integral molding is not possible, depending on the length of a through hole, it is possible to achieve a through hole shorter than that of a conventional slider enclosure, and to make the root portion of a milling tool as thick as the thickness of the pillar or even thicker, which facilitates milling machining for formation of a through hole. With the above, it is possible to readily form a long hole for an FCC by means of milling machining, and thus to reduce the number of wiring steps without increasing a machining cost. With the above, according to the present invention, it is possible to provide a slider unit of a linear encoder with lower cost.

Note that according to a conventional linear encoder, it has been considered senseless to form a bored portion in a pillar as in the present invention, as the formation deteriorates sealing performance of the linear encoder. However, an actual analysis of a relationship between a pillar and a seal proves that, at the middle portion of the pillar, the seal contacts the pillar only in a part closer to the slider holding unit and that a part of the pillar closer to the detection head holding unit does not contribute at all to sealing performance. This analysis can enable the present invention.

BRIEF DESCRIPTION OF DRAWINGS

Preferred embodiments of the present invention will be described in detail with reference to the following figures, wherein:

FIG. 3 shows a specific structure of a conventional linear encoder; and

FIG. 4 is a cross sectional view along line B-B' in FIG. 3

DETAILED DESCRIPTION OF THE INVENTION

Figure 1:
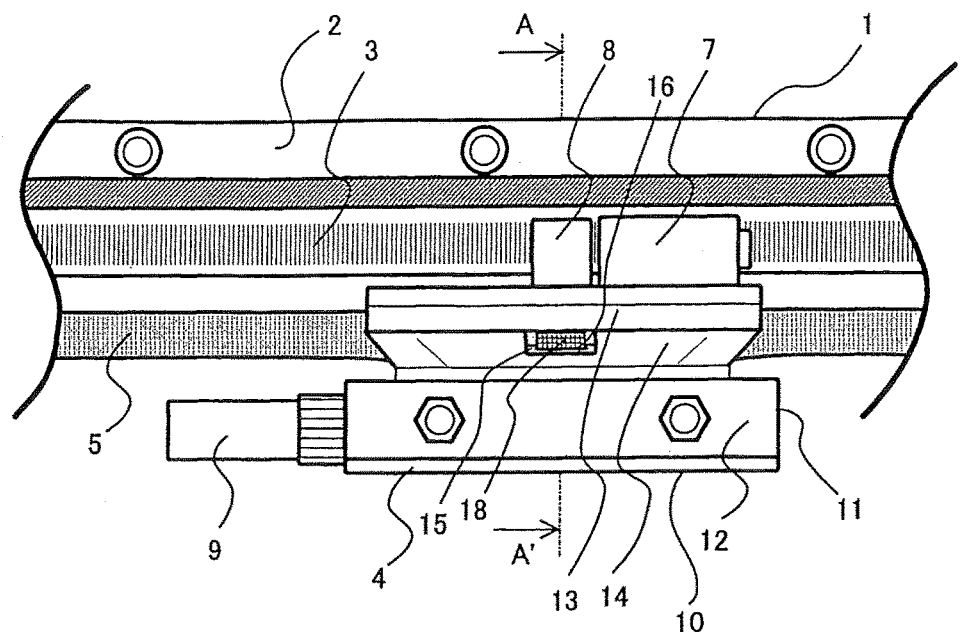
FIG. 1 shows a specific structure of a linear encoder according to the present invention.
Figure 2:
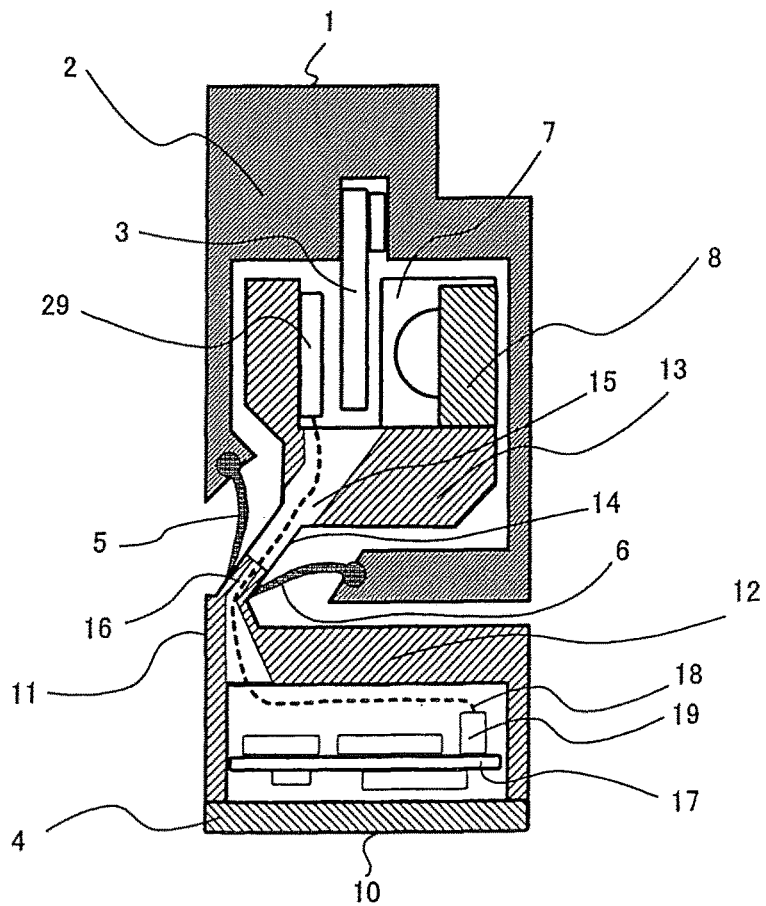
FIG. 2 is a cross sectional view along line A-A' in FIG. 1.

In the following, the present invention will be described with reference to the drawings. FIG. 1 shows a specific structure of a linear encoder according to the present invention. FIG. 2 is a cross sectional view along line A-A' in FIG. 1. Note that for ready understanding, the seal 6 and the upper surface of the scale enclosure 2 (the right end surface in FIG. 2) are not shown in FIG. 1. In FIGS. 1 and 2, a member having the same function as that in FIGS. 3 and 4 is given the same reference numeral, and is not described. The detection head holding unit 13 of the slider enclosure 11 and a part of the pillar 14 have a shape formed by boring a part up to a position immediately before a position where the pillar 14 contacts the seals 5, 6 on the side of the detection head holding unit 13 by a thickness larger than the thickness of the pillar 14.

That is, as is obvious from the drawing, the detection head holding unit 13 is fully accommodated in the hollow space formed inside the scale enclosure 2. At the corner of the scale enclosure 2, an opening is formed so as to provide communication between the outside and inside of the scale enclosure 2, and the pillar 14 extends through the opening between the outside and inside of the scale enclosure 2. That is, the detection head holding unit 13 is not exposed to the outside, while the pillar 14 is partly exposed to the outside. The seals 5, 6 are secured on the scale enclosure 2, and the respective tip ends of the seals 5, 6 are in contact with the pillar 14. A part of the pillar 14 closer to the detection head holding unit 13 than the position where the seals 5, 6 contact the pillar 14 is not exposed to the outside.

In this embodiment, in a part of the pillar 4 closer to the detection head holding unit 13 than a position where the pillar 14 contacts the seals 5, 6; in other words, a part of the pillar 14 not exposed to the outside, and in a part of the detection head holding unit 13 closer to the pillar 14, a bored portion 15 is formed. Note that it is desirable that the bored portion 15 is formed at substantially the middle of the pillar 14 in the scale longitudinal direction (the left-right direction in FIG. 1). However, so long as it is possible to ensure a seal for the opening of the scale enclosure 2, the position of the bored portion 15 is not limited to the middle in the scale longitudinal direction, but may be at other positions.

Between the bored portion 15 of the pillar 14 and the slider holding unit 12, a long through hole 16 is formed. In the slider enclosure 11, the slider holding unit 12, the detection head holding unit 13, the pillar 14, the bored portion 15, and the through hole 16 are integrally molded by means of lost wax casting, die casting, or the like, using metal, such as aluminum or the like. An FCC 18 is connected to the light-receiving unit 29, and also to an FPC connecter 19 mounted on the circuit board 17 while passing through the bored portion 15 and the long through hole 16.

In the embodiment shown in FIGS. 1 and 2, an example is described in which the through hole 16 of the pillar 14 is integrally molded. However, in the case where integral molding of the through hole 16 is difficult to perform, the long through hole 16 may be formed in post processing by means of milling machining. Alternatively, the bored portion 15 may be formed not at the time of integral molding, but in post processing by means of milling machining. Although an optical linear encoder is described as an example in the above embodiment, the present invention can be applied to a magnetic or electromagnetic inductive linear encoder.

What is claimed is:

1. A linear encoder having a scale unit and a slider that slides along the scale unit, wherein
the slider has a slider enclosure including a slider holding unit, a detection head holding unit mounted inside a scale enclosure of the scale unit, and a pillar extending between outside and inside of the scale enclosure to connect these two holding units, and
a part of the pillar closer to the detection head holding unit and a part of the detection head holding unit closer to the pillar are bored by a thickness larger than a thickness of the pillar.

2. The linear encoder according to claim 1, wherein boring of the pillar is applied to a part closer to the detection head holding unit than a position where a seal secured on the scale enclosure contacts the pillar when the pillar is assembled to the scale unit.

3. The linear encoder according to claim 1, wherein the slider enclosure is formed so as to include a through hole integrally molded between the part bored of the pillar and the slider holding unit.

4. The linear encoder according to claim 1, wherein the slider enclosure is given post processing for forming a through hole between the part bored of the pillar and the slider holding unit by means of milling machining.

5. The linear encoder according to claim 2, wherein the slider enclosure is formed so as to include a through hole integrally molded between the part bored of the pillar and the slider holding unit.

6. The linear encoder according to claim 2, wherein the slider enclosure is given post processing for forming a through hole between the part bored of the pillar and the slider holding unit by means of milling machining.

* * * * *